United States Patent

[11] 3,631,355

[72] Inventor Robert W. Vail
Newport Beach, Calif.
[21] Appl. No. 81,231
[22] Filed Oct. 16, 1970
[45] Patented Dec. 28, 1971
[73] Assignee North American Rockwell Corporation

[54] SYNCHRONOUS DEMODULATOR
4 Claims, 3 Drawing Figs.

[52] U.S. Cl. .......... 329/50, 307/232, 307/242, 328/134
[51] Int. Cl. .......... H03d 3/18
[50] Field of Search .......... 329/50; 307/232, 241, 242; 328/133, 134, 71; 178/5.45 D

[56] References Cited

UNITED STATES PATENTS 3,403,345 9/1968 Frank et al. .......... 329/50 X

*Primary Examiner*—Alfred L. Brody
*Attorneys*—L. Lee Humphries, H. Frederick Hamann and Edward Dugas

ABSTRACT: The invention is a switching type of synchronous demodulator in which the periods of switched closure are controlled in such a way that the filtered output of the demodulator is unaffected by certain harmonics of the carrier.

The demodulator is comprised of an input terminal for receiving an amplitude modulated carrier signal and a pair of switching means. Each of the switch means is connected to the input terminal in the closed position. A filter means is connected to the output of each of the switching means and an inverter is connected to one of the switching means to invert the signal passing through that switching means. A control means is provided for alternately holding said switches closed for two periods of 120° each during two complete 360° cycles of the carrier signal and for holding both switches open for the remainder of each cycle.

INVENTOR
ROBERT W VAIL
BY
Edward Dugas
ATTORNEY

INVENTOR
ROBERT W. VAIL

BY Edward Dugas
ATTORNEY

SYNCHRONOUS DEMODULATOR

BACKGROUND OF THE INVENTION

In standard switching demodulators, the switches are closed during the time that the phase angle of the reference signal ranges from zero to 180° and the second switch during the time that the phase angle ranges from 180° to 360°. This produces an output which is the desired modulation signal provided that no odd harmonics of the carrier are present at the input. However, if odd harmonics in the carrier are present at the input, they can cause errors in the demodulated signal in both amplitude and phase. With control of closure of the switches as set forth in the following description, not only are the even harmonics of the carrier prevented from affecting the output, but also the third and fifth harmonics of the carrier and their multiples are reflected.

SUMMARY OF THE INVENTION

The present invention relates to a synchronous demodulator in which periods of switching closure are controlled in order to filter out certain harmonics of the reference carrier. In a preferred embodiment of the invention, this is accomplished by providing an input terminal for receiving a modulated carrier signal with a first and second switch means connectable to the input terminal. An inverting means is connected to one of the switching means to invert the signal passing through the switching means. A filter means removing carrier related frequencies is connected to the first and second switch means. A control means is provided for alternately holding the switches closed for two periods of 120° each for two 360° cycles of the reference carrier with each period being separated by a period which is a multiple of 12°. This particular method of closing the switches eliminates even harmonics of the carrier along with the third and fifth harmonics and multiples thereof.

Accordingly, it is an object of the present invention to provide a new and novel synchronous demodulator.

It is another object of the present invention to provide a synchronous demodulator which eliminates even harmonics of the carrier and certain odd harmonics and multiples thereof.

It is another object of the present invention to provide a synchronous demodulator which utilizes novel switching periods to provide an undistorted output signal.

The aforementioned and other objects of the present invention will become more apparent when taken in conjunction with the following description and drawings in which like numbers designate like parts.

DESCRIPTION OF THE PREFERRED EMBODIMENT

Figure 1:
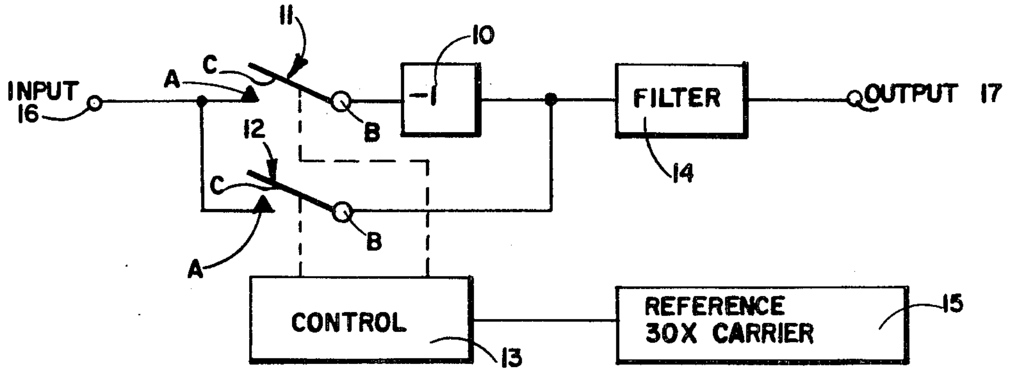
FIG. 1 illustrates in block diagram form the preferred embodiment of the invention.

A pair of switches 11 and 12 have conductive electrodes A and B which are electrically connectable by means of a control electrode C. Input terminal 16 receives a carrier modulated signal. Input terminal 16 is connected to conductive terminals A of switches 11 and 12. The electrode C of switch 11 is connected to the input of an inverter 10 whose output is connected to the input of filter 14. Filter 14 operates to remove carrier related frequencies and to provide the filtered output signal to the output terminal 17. The control electrodes C of switches 11 and 12 are connected to the output of control means 13. Control means 13 receives as an input the output from a reference carrier signal source 15 which output is a signal which is 30 times the carrier frequency. The reference signal is synchronous with the carrier and through the control means 13 operates the switches 11 and 12.

Figure 2:
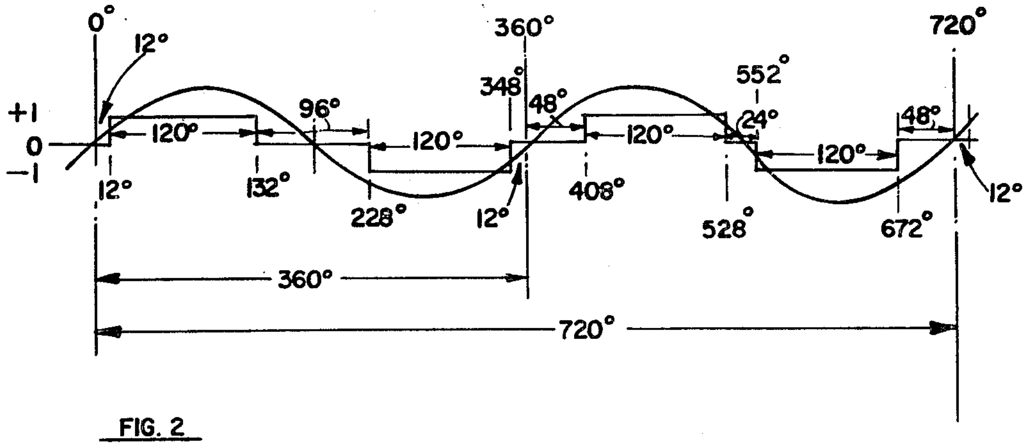
FIG 2 illustrates in graphic form the open and closure periods of the switches.

Referring to FIG. 2 in connection with the demodulator of FIG. 1; FIG. 2 defines the periods of switch closure as a function of the carrier phase angle. The fundamental of the carrier is assumed to be sinusoidal with a positive zero crossing at zero phase angle. FIG. 2 shows the switch closures for two successive cycles of the carrier. The pattern then repeats itself. Switch 12 is closed over those phase angles for which the curve is a +1, and switch 11 is closed over those phase angle for which the curve is a −1, and both switches are open where the curve is at the zero level. All of the intervals in the pattern are multiples of a 12° phase angle. The following chart depicts the periods of operation of the two switches:

| | |
|---|---|
| OPEN | 0°–12° |
| CLOSE FIRST SWITCH MEANS | 12°–132° |
| OPEN | 132°–228° |
| CLOSE SECOND SWITCH MEANS | 228°–348° |
| OPEN | 348°–408° |
| CLOSE FIRST SWITCH MEANS | 408°–528° |
| OPEN | 528°–552° |
| CLOSE SECOND SWITCH MEANS | 552°–672° |
| OPEN | 672°–720° |

Figure 3:
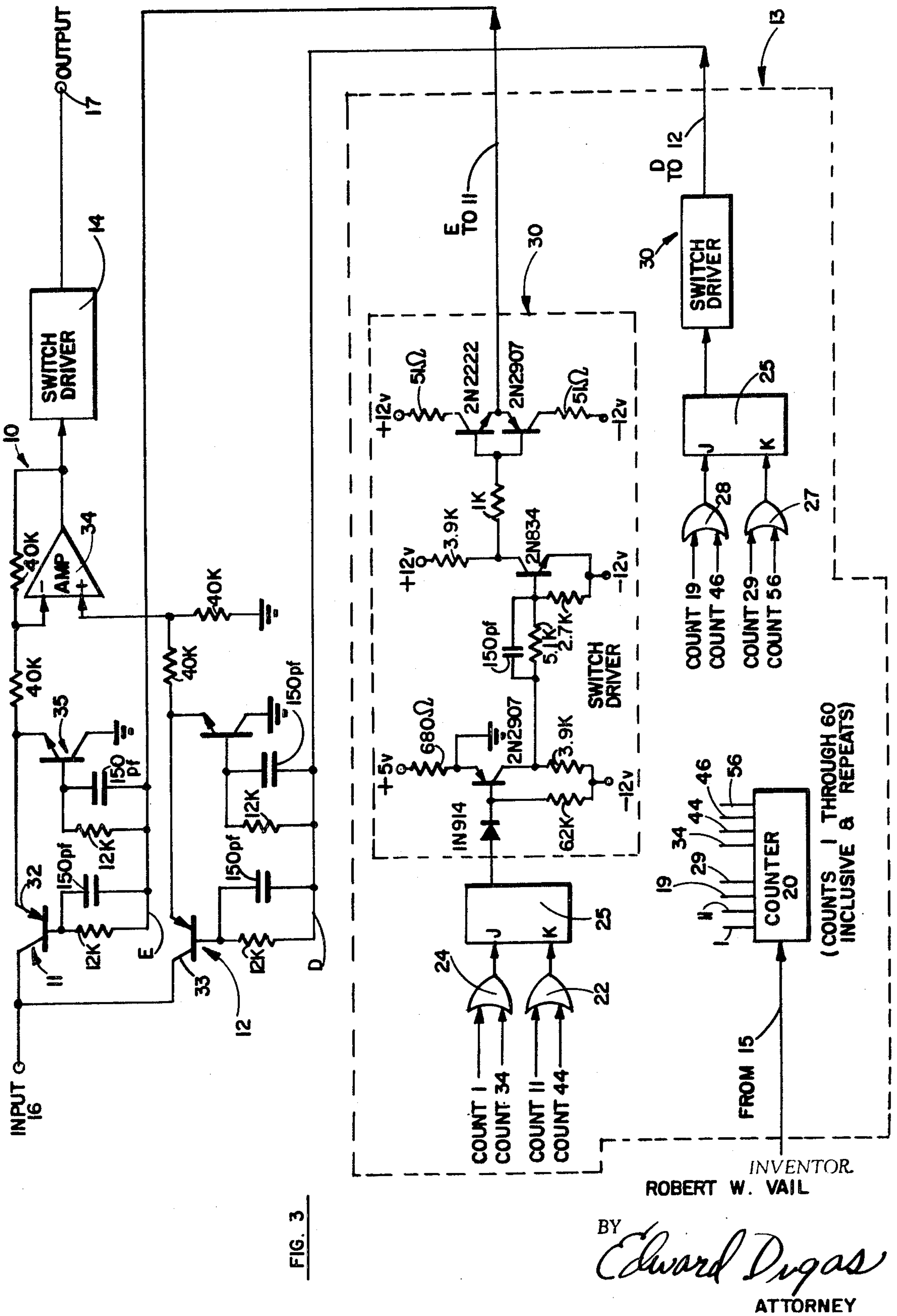
FIG. 3 illustrates in circuit diagram form the preferred embodiment of FIG. 1.

Referring now to FIG. 3, the input terminal 16 is connected to the collectors of transistors 32 and 33 which form part of the switching means 11 and 12, respectively. The emitter of transistor 32 is connected through a 40 KΩ resistor to the negative input terminal of an operational amplifier 34. The emitter of transistor 33 is connected through a similar resistor to the positive input terminal of amplifier 34. The output labeled E from the control means 13 is connected to the base of transistor 32 and to the base of a transistor 35 through biasing resistors in such a manner that when the potential on line E goes negative the input terminal 16 is effectively connected to the negative input terminal of amplifier 34 and when the potential at point E goes positive the input terminal 16 is disconnected from the input of amplifier 34. In an identical configuration, switch 12 is connected to terminal D. The output of amplifier 34 is fed to the input of filter 14 with the output of filter 14 connected to the output terminal 17. The control means 13 is comprised of a counter 20 which receives the reference signal from 15 and continually counts 1 through 60 and repeats the count. Counts 1, 11, 19, 29, 34, 44, 46 and 56 are used by the counter means. OR-gates 22, 24, 28 and 27 receive the indicated counts and provide an output signal indicative of the presence or absence of the count to flip-flops 25 which are of the JK type. The output of each flip-flop 25 is connected to identical switch drivers 30 which drivers switch between a positive and a negative voltage in order to drive the bases of transistors 32 and 33 into conduction or cutoff in response to the count from the counter 20. A typical schematic for a switch driver is shown with all elements labeled as to size, potential and identifying part numbers. It would be obvious to persons skilled in the art that various other arrangements may be utilized for the controller and that the one shown is for purposes of illustration only and not to be taken as a limiting feature.

While there has been shown what is considered to be the preferred embodiment of the invention, it will be manifest that many changes and modifications may be made therein without departing from the essential spirit of the invention. It is intended, therefore, in the annexed claims to cover all such changes and modifications as may fall within the true scope of the invention.

I claim:

1. A synchronous demodulator comprising in combination:
an input terminal for receiving an amplitude modulated carrier signal;
a pair of switching means connectable to said input terminal;

filter means having an input connected to said pair of switching means, said filter means operating to remove carrier related frequencies from the signal present at its input;

an inverter series connected in the path defined between said input terminal, one of said switching means, and the input to said filter means, for inverting any signal traveling said deferred path; and control means for alternately closing said switching means for a period of 120° each 180° period of said carrier signal.

2. The synchronous demodulator of claim 1 wherein said control means is comprised of:

a reference signal generator for providing a signal which is synchronous with and 30 times greater than the carrier frequency;

counter means for counting the phase angle of the reference signal from said generator in increments of 12°; and logic means connected to said pair of switching means for opening and closing said switching means in accordance with the following table for every two cycles of said carrier signal:

| | |
|---|---|
| OPEN | 0°–12° |
| CLOSE FIRST SWITCHING MEANS | 12°–132° |
| OPEN | 132°–228° |
| CLOSE SECOND SWITCH MEANS | 228°–348° |
| OPEN | 348°–408° |
| CLOSE FIRST SWITCH MEANS | 408°–528° |
| OPEN | 528°–552° |
| CLOSE SECOND SWITCH MEANS | 552°–672° |
| OPEN | 672°–720° |

3. A synchronous demodulating system comprising:

an input terminal for receiving said modulated carrier signal;

a filter means for removing carrier related frequencies;

a first and a second switch means each having a first and a second conductive electrode and a third control electrode, said first electrodes of said first and said second switch means connected to said input terminal, said second electrodes of said first and said second switch means connected to the input of said filter means;

an inverting means interposed in the conductive path of said first switch means for inverting the signal traversing said path; and control means for providing control signals to said third control electrodes to open and close the conductive path between said first and second conductive electrodes of said first and said second switch means, said control means alternately holding said switch means closed for two periods of 120° each for two 360° cycles of said carrier signal with each 120° period separated by periods which are multiples of 12°.

4. The invention according to claim 3 wherein said control means comprises:

a reference signal generator for providing a signal which is synchronous with and 30 times greater than the carrier frequency; and a counter means for counting the phase angle of the reference signal from said generator in increments of 12°;

logic means connected to said first and said second control electrodes for opening and closing the conductive path between said first and second conductive electrodes in accordance with the following table for every two cycles of said carrier signal:

| | |
|---|---|
| OPEN | 0°–12° |
| CLOSE FIRST SWITCH MEANS | 12°–132° |
| OPEN | 132°–228° |
| CLOSE SECOND SWITCH MEANS | 228°–348° |
| OPEN | 348°–408° |
| CLOSE FIRST SWITCH means | 408°–528° |
| OPEN | 528°–552° |
| CLOSE SECOND SWITCH MEANS | 552°–672° |
| OPEN | 672°–720° |

* * * * *

PO-1050
(5/69)

UNITED STATES PATENT OFFICE
CERTIFICATE OF CORRECTION

Patent No. 3,631,355 Dated December 28, 1971

Inventor(s) Robert W. Vail

It is certified that error appears in the above-identified patent and that said Letters Patent are hereby corrected as shown below:

Claim 1, Column 3, line 8, delete "deferred" and substitute therefor --defined--.

Figure 3, reference numeral 14, delete "Switch Driver" and substitute therefor --Filter--.

Column 1, line 65, delete "C" and substitute therefor --B--.

Signed and sealed this 6th day of February 1973.

(SEAL)
Attest:

EDWARD M.FLETCHER,JR.
Attesting Officer

ROBERT GOTTSCHALK
Commissioner of Patents